Sept. 26, 1933.  K. C. BARTON  1,928,241
PROCESS OF CONDITIONING OIL BEARING MATERIALS
Filed June 25, 1930
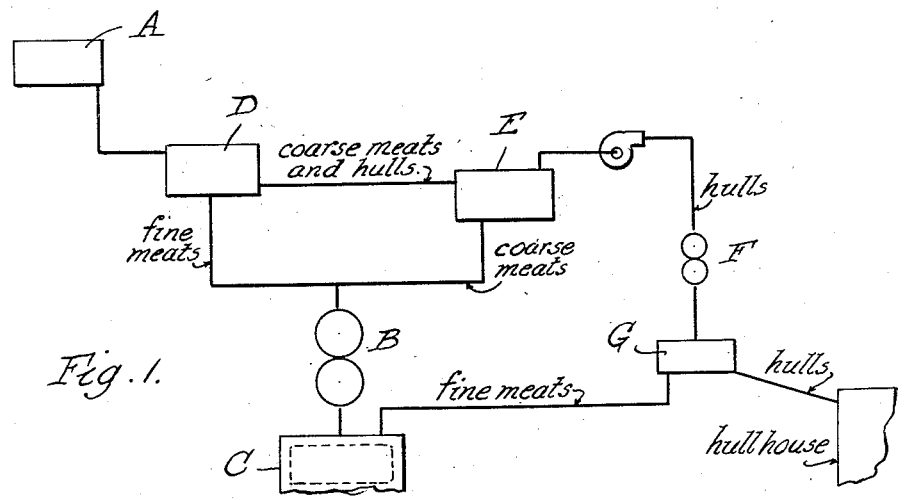
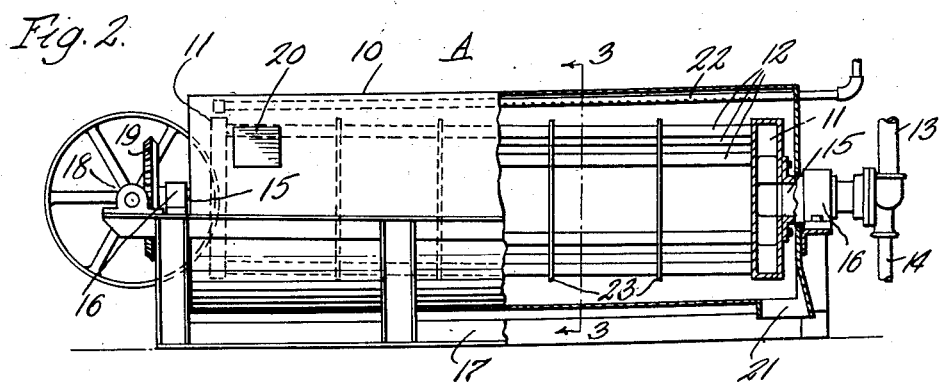
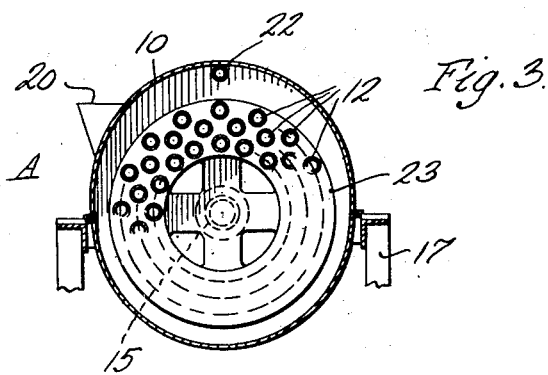
INVENTOR.
Kirtland C. Barton
by Parker & Umphrow
ATTORNEYS.

Patented Sept. 26, 1933

1,928,241

UNITED STATES PATENT OFFICE

1,928,241

PROCESS OF CONDITIONING OIL BEARING MATERIALS

Kirtland C. Barton, East St. Louis, Ill., assignor to The French Oil Mill Machinery Company, Piqua, Ohio Application June 25, 1930. Serial No. 463,808

4 Claims. (Cl. 87—12)

This invention relates more particularly to a method of and apparatus for conditioning or preparing oil bearing materials, such as the meats of cotton seed, linseed and other seeds and nuts, for the purpose of increasing the yield and quality of the oil obtained from the material, and increasing the efficiency of the oil expressing operation.

In what is probably the most usual method of expressing oil from cotton seed, for example, the seeds are first hulled and the meats or broken kernels of the seeds, after being separated as far as practicable from the hulls, are crushed by means of rolls to reduce the meats to flakes and break down the oil cells. The crushed or flaked material is then cooked to the proper consistency, ordinarily by passing it through a succession of steam heated kettles, after which the oil is expressed from the material in the hydraulic press. The method used for other seeds and analogous material is similar, except in the cases of linseed or other seeds that do not have hulls, the hull separating operation is unnecessary.

The yield and quality of the oil obtained from the material and also the quality of the oil cake and the percentage of oil remaining in the latter, as well as the efficiency of operation of the apparatus and the labor involved depend in large measure upon the proper breaking down of the oil cells and the consistency and other characteristics of the material when the same is placed in the expressing press, and various methods heretofore proposed for treating or preparing the material have had to do principally with the cooking or treating of the meats after the crushing or flaking of the same.

One object of my invention is to condition or treat the oil bearing material preparatory to crushing or flaking of the same whereby the yield of oil therefrom will be increased and its quality improved and the percentage of oil left in the oil cake will be reduced.

Other objects of the invention are to provide a method and apparatus which will result in a great saving in cost and labor in the production of oil from oil bearing materials by the expressing process; also to condition or treat the seed or meats preparatory to crushing the same so as to soften and swell or puff the meats, whereby in the crushing of the meats by the crushing rolls the oil cells will be more effectively and thoroughly broken down and the meats will be reduced to thinner flakes.

In the manufacture of cotton seed oil, the cotton seeds are hulled and the hulls separated from the meats before crushing the meats, as before explained, but it has been found difficult to make a perfect and complete separation of the hulls from the meats, and more or less of the hulls remain in the meats during the crushing and subsequent operations on the meats. The hulls contain practically no oil but if they are mixed with the meats when the latter are pressed, they absorb and hold a considerable percentage of oil from the meats and, therefore, decrease the amount of oil expressed from the material.

Another object of the invention, particularly in the case of cotton seed, therefore is to insure a more complete separation of the hulls from the meats before the meats are crushed.

Furthermore, the elimination of the hulls from the meats before crushing the meats increases the capacity of the rolls and results in a better flaking of the meats and breaking down of the oil cells. This is due to the fact that the hulls are tougher or harder than the meats and unless the hulls are treated so that they can be reduced to a thinner condition, they act to hold the rolls apart and prevent the meats from being crushed or flaked as thin as they would be if the hulls were not present.

In the accompanying drawing:

Fig. 1 is a diagrammatic view of apparatus embodying my invention and for performing my improved method of conditioning oil bearing seed or material.

Fig. 2 is a sectional elevation of the improved conditioning device.

Fig. 3 is a vertical cross section thereof on line 3—3, Fig. 2, on an enlarged scale.

According to my invention, the seeds, or the meats together with any hulls remaining in the meats, are passed through a conditioning device A in which they are heated and in which also, if this is necessary, on account of an insufficiency of moisture in the material entering the conditioning device, moisture is added to the material. This treatment of the material in the conditioner A softens and swells or puffs the meats to a condition more or less like puffed wheat, but not to such a great extent, so that when subsequently crushed by the passing between the crushing rolls B, the meats will be reduced to a thin, flaked condition and the oil cells will be more thoroughly broken down.

The conditions in the conditioning device A are regulated so that the material will be brought to the required temperature and to a softened, puffed condition without being either dried or moistened too much. The meats should have the required amount of moisture to leave them soft and pliable, but on the other hand, an excessive amount of moisture would make the meats too soft, and particularly in the case of cotton seed, would cause the meats to stick to the unseparated hulls. When unconditioned meats, in which the hulls are present, are passed through the crushing rolls, the hulls, being tough and hard and fairly dry, will not roll out or flake as readily and as thin as they would if treated as explained in the conditioner A, but on the contrary, they will set up a resistance to the crushing operation, and a considerable percentage of the meats will pass through the rolls and are not rolled thin enough, which is objectionable and decreases the oil yield. It is important in the heat treatment in the conditioning device A that the heat, and also the moisture, if moisture is added, shall penetrate to the center of the meats, otherwise the best results are not obtained. Therefore it is essential that the treatment of the meats shall be continued long enough to insure the required condition of the meats.

In order to insure these results a conditioning device A of the type shown in the drawing is preferably employed. This comprises a substantially cylindrical stationary casing 10 within which revolves about an inclined axis, a steam heater consisting of opposite hollow circular headers 11 connected by steam pipes 12 which extend lengthwise in the casing and are preferably arranged spaced apart in a plurality of circular rows. Steam is passed through the headers and pipes and as the heater revolves within the casing the meats are lifted or carried up and dropped in the casing being thereby kept in agitation and heated.

Steam may be circulated through the heater by any suitable means, as for instance, by supply and drain pipes 13 and 14 connected by an axial swivel coupling to one header 11 of the heater. The heater may be rotatably mounted, as by journals 15 on the headers turning in bearings 16 on a stationary frame 17, or in any other suitable way, and may be revolved by a driven pinion 18 meshing with a gear wheel 19 on one header, or by other means.

The meats are fed to the casing through an opening 20 at the upper end thereof and pass slowly through the casing, being agitated and heated by the rotating pipe heater as explained, and are finally discharged through an outlet 21 from the lower end of the casing. For the purpose of adding moisture, when this is necessary, to the meats during the heating thereof, a perforated pipe 22 may extend lengthwise in the upper portion of the casing 10 substantially from end to end thereof through which pipe steam and water may be discharged into the conditioner. In order to subject the material for the necessary length of time to treatment in the conditioner to insure the penetration of the heat and moisture, if moisture is added, throughout the meats, the heater is revolved slowly, preferably about three revolutions per minute, and should be of ample size and capacity to insure the desired slow continued treatment of the meats. Preferably also the pipes are provided with baffle plates 23 to prevent the material from flowing too rapidly through the machine.

The best results are obtained by regulating the heating of the material so as to bring it to a temperature between about 200 degrees F. and about 215 degrees F., and regulating the moisture in the conditioner so that the material will leave the conditioner with from about 12% to 15% of moisture.

After conditioning the meats, as explained, in the conditioner A and crushing or flaking the meats by the rolls B, the meats are cooked in a suitable cooker C which may be of ordinary type, consisting of a plurality of steam heated kettles through which the meats pass in succession and in which they are cooked to the required consistency. After cooking, the meats are formed into cakes placed in a hydraulic press and subjected to pressure to express the oil therefrom in the usual manner.

Very little power is required to operate the conditioner but it greatly improves the rolling and crushing or flaking of the meats with the result that the meats thus conditioned show a greatly increased oil yield leaving a low percentage of oil in the cake and resulting in a great saving to the mill using this equipment.

In the manufacture of oil from linseed and similar material having no hulls, the above described steps complete the process. In the manufacture of cotton seed oil, however, owing to the hulls remaining in the meat, with the consequent disadvantage due to the presence of the hulls, before explained, the process is preferably amplified as follows:

After the meats, with the hulls which remain therein after the usual incomplete separation of the hulls from the meats, are conditioned or treated as explained in the conditioner A, the material is delivered to the revolving beater D equipped with a fine mesh metal cloth or screen to sift out the fine meats. The coarse meats and hulls discharged from this beater D are delivered to a machine E which removes the hulls from the coarse meats. This machine, which is termed the "ammonia machine", as usual, is equipped with a suction system which, by suction, lifts the hulls and any remaining fine dust, separating them from the heavier coarse meats. The fine meats discharged from the revolving beater D and the coarse meats from the ammonia machine E are then delivered to and passed through the large crushing rolls B, while the hulls discharged from the ammonia machine E are delivered to and passed through small crushing rolls F. The hulls which pass through the small set of rolls are flaked thin by these rolls. The hulls having been softened by the treatment in the conditioner, are flaked much thinner than they would be if they had not been treated in the conditioner.

From the small set of rolls F, the flaked hulls are delivered to a revolving brush beater G equipped with brushes revolving in the opposite direction from the outer casing of the beater which operates to brush off any small meats attached to the flaked hulls. All of the meats, including the fine meats coming from the first beater D, the coarse coming from the ammonia machine E and the fine meats from the beater G, are delivered to the cooker C and are all cooked in the usual manner, and after cooking, are as above explained, formed into cakes and the cakes placed into the press for expressing the oil from the cakes. The hulls discharged from the final beater G, which are then practically entirely free from the meats, can be sent to the hull house and can be ground up with cake from the press to make feed or meal having the desired ammonia content.

The separating of the hulls from the meats, as explained, insures an additional saving, in that the hulls contain no oil, but if they were passed through the press with the meats, they would absorb and hold a substantial amount of oil. Therefore, by not pressing the hulls with the meats, this oil is not absorbed and lost. The hulls, if passed through the rolls B with the meats, would absorb from approximately 4% to 4½% of the oil at the rolls and they would absorb up to approximately 6% of the oil in the press, the average oil content of the cake in the press. The separation of the hulls from the meats before the meats are crushed by the rolls and the elimination of the hulls from the meats in the press increases the capacity and results in better rolling and increased oil yield.

By the described process it is also possible to increase the amount of lint cut from the seed. Instead of the usual amount of from 100 to 125 pounds of lint per ton of seed, it is possible with this process to remove from 150 to 160 pounds of lint per ton of seed. Except for the processing of the hulls in the condenser, this increased removal of the lint from the seeds would not be practicable since the lesser amount of lint on the hulls makes it more difficult to separate the hulls from the meats, but after the hulls have been subjected to the described treatment in the conditioner, they are rolled thinner by the crushing rolls and can be easily separated from the meats by suction in the ammonia machine, notwithstanding the reduced amount of lint.

I claim as my invention:

1. The process of conditioning cotton seed and analogous seed having hulls for expressing the oil therefrom, which comprises first hulling the seed and preliminarily separating the meats from the hulls, then heating the material consisting of the meats and any hulls remaining therein in the presence of sufficient moisture to cause the material to soften and swell, then separating said remaining hulls from the meats, then crushing the meats, and thereafter cooking the crushed meats.

2. The process of conditioning cotton seed and analogous seed having hulls for expressing the oil therefrom, which comprises first hulling the seed, then heating the material consisting of the hulled meats and any hulls remaining therein, in the presence of sufficient moisture to cause the material to soften and swell, then separating said remaining hulls from the meats separately crushing the meats and hulls, then separating from the hulls and fine meats adhering to the hulls and then cooking the meats, including such fine meats.

3. The process of conditioning cotton seed and analogous seed having hulls for expressing the oil therefrom, which comprises first hulling the seed, then heating the material consisting of the hulled meats and any hulls remaining therein in the presence of sufficient moisture to cause the material to soften and swell, then separating said remaining hulls from the coarse meats, separately crushing the coarse meats and hulls, then separating from the crushed hulls any fine meats adhering to the hulls, and then cooking the coarse and fine meats together.

4. The process of conditioning cotton seed and analogous seed having hulls for expressing the oil therefrom which comprises first hulling the seed, then heating the material consisting of the hulled meats and any hulls remaining therein in the presence of sufficient moisture to cause the material to soften and swell, then separating the fine meats from the coarse meats and hulls, then separating the hulls from the coarse meats, separately crushing the hulls and the meats which have been separated from the hulls, then separating from the crushed hulls any fine meats adhering to the hulls, and then cooking all of the meats.

KIRTLAND C. BARTON.